United States Patent [19]

Nakayama

[11] Patent Number: 4,973,146
[45] Date of Patent: Nov. 27, 1990

[54] ELECTRICALLY DRIVING SYSTEM FOR FOLDABLE REARVIEW MIRRORS OF MOTOR VEHICLE

[75] Inventor: Kiyoshi Nakayama, Shizuoka, Japan

[73] Assignee: Murakami Kameido Co., Ltd., Shizuoka, Japan

[21] Appl. No.: 203,735

[22] Filed: Jun. 7, 1988

[30] Foreign Application Priority Data

Jun. 30, 1987 [JP] Japan .................................. 62-89033

[51] Int. Cl.$^5$ ............................ B60R 1/06; G02B 5/08
[52] U.S. Cl. ..................................... 350/637; 350/604; 307/10.1; 318/445; 361/24; 361/27; 361/195
[58] Field of Search ............... 350/604, 606, 612, 626, 350/637; 307/10 R; 361/27, 23, 24, 31, 27, 194, 195; 318/445, 466, 484

[56] References Cited

U.S. PATENT DOCUMENTS

| | | |
|---|---|---|
| 3,864,605 | 2/1975 | Kuhnlein et al. ...................... 361/27 |
| 4,037,316 | 7/1977 | Stoll ..................................... 361/27 |
| 4,626,084 | 12/1986 | Kumai ................................ 350/604 |
| 4,681,409 | 7/1987 | Enomoto ............................. 350/637 |
| 4,798,967 | 1/1989 | Yamana et al. ...................... 350/637 |

FOREIGN PATENT DOCUMENTS

| | | | |
|---|---|---|---|
| 0133837 | 11/1978 | Japan .................................. 350/637 |
| 61-105247 | 5/1986 | Japan .................................. 350/637 |
| 61-113533 | 5/1986 | Japan . | |
| 0113533 | 5/1986 | Japan .................................. 350/637 |
| 0193948 | 8/1986 | Japan .................................. 350/637 |
| 0215142 | 9/1986 | Japan .................................. 350/604 |
| 0218452 | 9/1986 | Japan .................................. 350/604 |

*Primary Examiner*—Bruce Y. Arnold
*Assistant Examiner*—R. D. Shafer
*Attorney, Agent, or Firm*—Michael J. Striker

[57] ABSTRACT

An electrically driving system for the rearview mirrors, wherein the incorporated motors are rotated normally or reversibly in response to the operation of a operational switch, thereby erecting or folding the mirror bodies. The system comprises a momentary operational switch, a relay circuit, a group of limit switches for cutting off the relay circuit and motor circuit respectively by detecting erected and folded positions of the mirror bodies, and a circuit for judging a folded state. When the operational switch is pushed, any folded mirror is detected within delay time of the circuit for judging a folded state. And only when both of the left and right mirror bodies are in the fold positions, the erecting relay is actuated to rotate the motors in the erecting direction.

6 Claims, 4 Drawing Sheets

ELECTRICALLY DRIVING SYSTEM FOR FOLDABLE REARVIEW MIRRORS OF MOTOR VEHICLE

BACKGROUND OF THE INVENTION

1. Field of the Invention

This invention relates to a rearview mirror and, more particularly, to an electrically driving system for foldable rearview mirrors of motor vehicles.

2. Description of the Prior Art

Outer rearview mirrors are suitably folded at their mirror body to reduce their length when parking or storing motor vehicles. Recently, there are electrically foldable rearview mirrors whose mirror body is turned form an erected position to a folded position with a reversible motor mounted in the mirror body. There is proposed a driving system in which relays and selfholding circuits are provided to let the motors be rotated and stopped indirectly in response to the operation of a switch in stead of rotating and stopping the motors directly by operating a switch.

Such an improved driving system is disclosed for example in Japanese Patent Application Laid-Open No. Sho. 61-113533. In this system, a motor circuit for each of the right and left mirror bodies includes an erecting relay and its holding circuit which are operated when turning the mirror body from the folded position to the erected position, as well as folding relay and its holding circuit which are operated when turning the mirror body from the erected position to the folded position. At either of the turning ends of the mirror body, a limit switch is operated to release a self-holding state so as to step the motor automatically. In this driving system, however, the limit switches for detecting the erected and the folded positions of the left and right mirror bodies can only put opening relays in a non-exited condition, and they can not put both relays and motors out of operation. Besides, it is necessary to provide reacting and folding relays and self-holding circuits for each of the left and right reversible motors. Therefore, the overall circuit is complicated, is inevitably large in size, requires a large number of assembling steps and dictates high cost of manufacture.

In Japanese Patent Laid-Open No. Sho. 61-105247 this applicant has disclosed a driving circuit for electrically foldable rearview mirrors which comprises a single-pole momentary push button switch, erecting and folding relays operated with the said bush button switch, a plurality of reversible motors rotated by the operation of either of the said push button switch and a folded-state judgment circuit provided with a PNP-type transistor. This driving circuit has a operation mode in which the folding relay is preferentially operated by the operation of the momentary push button switch, it is judgmented under the "ON" condition of the folding circuit whether both of the left and right mirrors are in the folded positions, both of the left and right mirrors are erected only when they are in the folded positions, either or both of the left and right mirrors are folded when they re not in the folded positions. That is, when both of the left and right mirror bodies are in the folded positions, the folding relay is excited first by pushing the push button, then plus voltage is impressed to an emitter of the transistor through a transfer contact. Because of earth potential applied to a base of the transistor through the closed single-pole single-throw switch interlocked with the push button, the transistor is put into "ON" condition at the same time, and the erecting relay is excited. Since the transfer contact of the folding relay changes over by the excitation of the erecting relay to demagnetize the folding relay, and since the erecting relay is self-held with the limit switch and so, the motors of the left and right mirror bodies are rotated to an erecting side. When the mirror bodies reach the erecting ends, the limit switch is mechanically forced open, and the motors are stopped by closing the motor circuits.

When one of the left and right mirror bodies is in the folded position, and the other is in the erected position or in the intermediate position between the erected and folded states, the unfolded mirror body is laid back and both of the mirror bodies are stopped in the folded position by the first operation of the push button, then the mirror bodies on both sides are turned in the erecting direction. That is, when the other mirror body is in the unfolded position, as described above, the folding relay is exited. Then the transfer contact of the folding relay changes over to impress plus voltage to the base of the PNP-type transistor through the single-pole single-throw switch interlocked with the limit switch and the push button switch o the unfolded position side. Since the transistor is not put to "ON" by this impressed voltage, the erecting relay is not excited, but because of the self-held folding relay the motor of mirror body is turned from the unfolded position to the folded position. At one turning end of the mirror body the limit switch on the folding side is opened to stop the motor. Since a single-pole single-throw switch interlocked with the push button is provided on the base input side of the PNP-type transistor, no folding operation begins immediately as long as the next operation of the push button is not performed after the mirror body has been folded. The push button switch and the single-pole single-throw switch interlocked therewith, however, form a two-pole single-throw operational switch. Therefore, the over fall circuit is complicated in construction, is low in degree of freedom of design and is large in size. It requires also a large number of wires between the switches and the control circuit as well as multi-pole connectors, and dictates high cost of manufacture.

An object of the present invention is to provide a compact and cheap driving circuit operated with only one momentary single-pole single-throw switch.

Another object of the present invention is to provide an electrically driving circuit for foldable rearview mirrors which ensures an accurate folding operation and can be provided at low cost.

SUMMARY OF THE INVENTION

According to the present invention, it is judgmented by plus or minus of voltage impressed to the base of a PNP-type transistor within delay time of a delaying circuit provided on the output side of the transistor whether the left and right mirror bodies are in folded positions, and an erecting relay is operated only when the left and right mirror bodies are in the folded positions.

In one preferred embodiment of the present invention, a circuit for judging a folded state comprises a PNP-type transistor and a delaying element provided on the output side of the said transistor, and this judgment circuit is connected in series with an erecting relay. A folding relay circuit comprises a folding relay, a transfer contact of the said relay, and a self-holding circuit equipped with limit switches for detecting folded positions. In another embodiment of the present invention, a timer circuit is connected inn series with the said folding and erecting relays respectively. The said timer circuits put both relays into actuation for a predetermined period of time by means of an electric charge obtained when throwing an operational switch.

The above and other objects, features and advantages of the present invention will become apparent from the following description and the appended claims taken in conjunction with the accompanying drawings which show by way of example preferred embodiments of the present invention and in which like components parts are designated by like reference numerals throughout the various figures.

DESCRIPTION OF THE PREFERRED EMBODIMENTS

Figure 1:
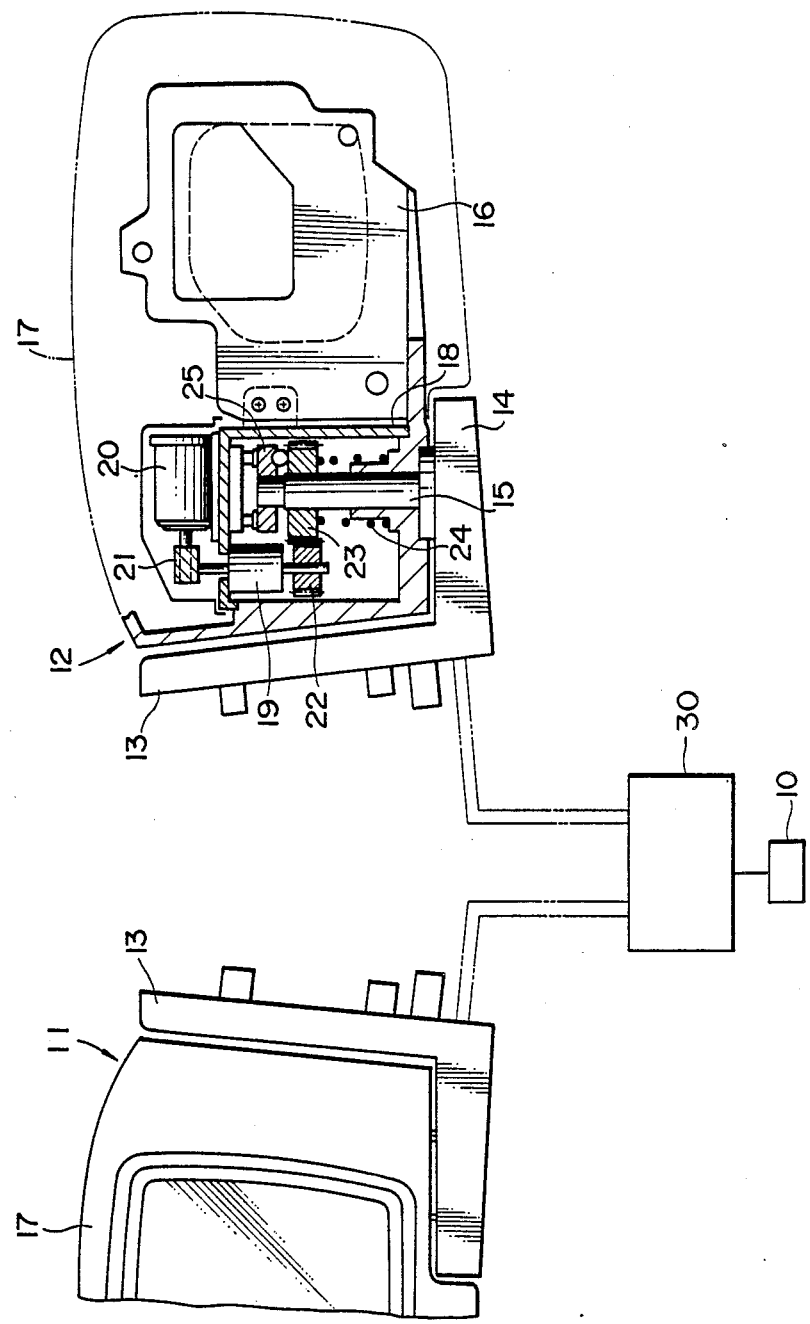
FIG. 1 is a schematic front view showing an outer rearview mirror folding system embodying the present invention.

The present invention will now be described in detail with reference to the drawings. Referring first to FIG. 1, there is shown a folding system of outer rearview mirror assembly suitable to be associated with a motor vehicle. This steam includes an operational switch 10 provided in a vehicle compartment, a controller 30, and left and right mirror assemblies 11 and 12. Each mirror assembly 11 or 12 includes a shaft 15 provided upright on an extension 14 of a base 13, a frame 16 rotatably supported on the shaft 15, mirror body 17, a gear box 18 provided in a rotating part of the frame 16 near the shaft, a build-in reduction gear mechanism 19 of the gear box and an electrical motor 20 for folding a mirror secured to the top of the gear box 18. The reaction gear mechanism 19, as shown in FIG. 1, consists of a reduction gear train connected to a worm gear 21 mounted to a motor output shaft engages with a clutch gear 23 mounted on the shift 15. The clutch gear 23 is spring-based by a resilient spring 24 towards a clutch retainer 25 secured to the top of the shaft. The mechanism and the function of the end gear 22, the clutch gear 23, the spring 24 and the clutch retainer 25 is known by a description of U.S. Pat. No. 4,626,084 patented on Dec. 2, 1986.

Figure 2:
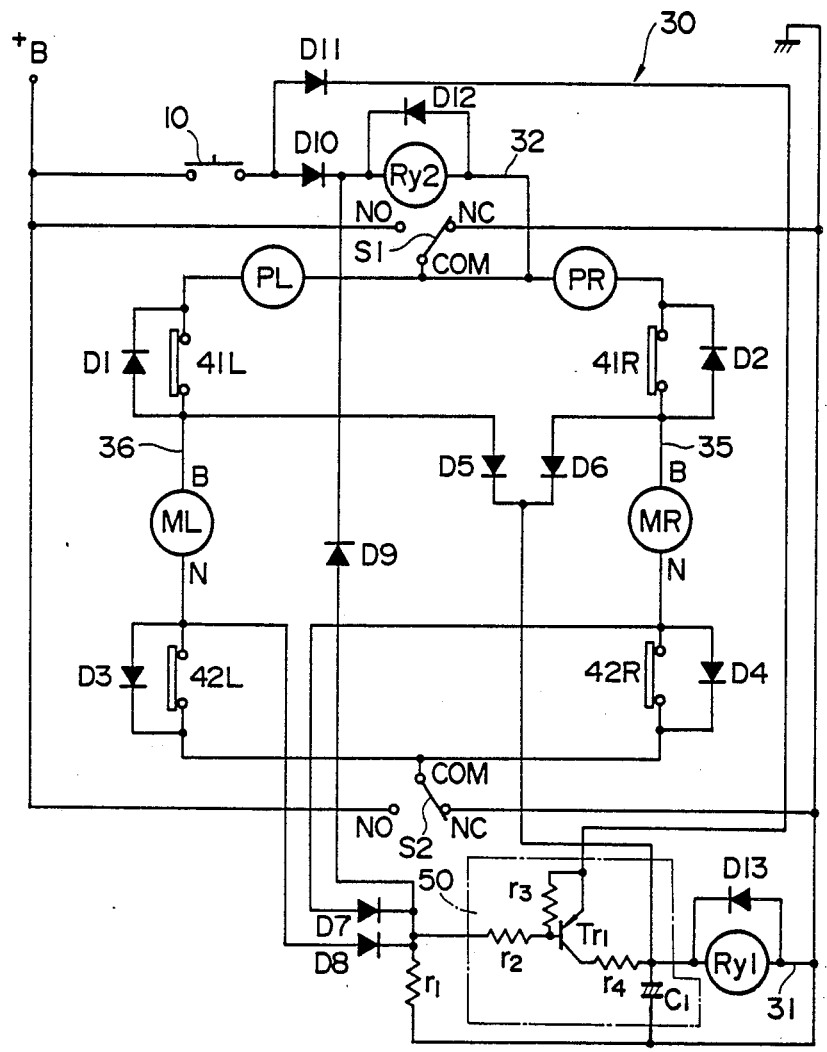
FIG. 2 is a circuit diagram showing one embodiment of the system according to the present invention.

FIG. 2 shows an electronic circuit diagram of the said controller 30. This circuit diagram includes a single-pole single-throw momentary operational switch 10, an erecting relay circuit 31 closed when turning a mirror body 17 to an erected position side, motor circuits 35 and 36, limit switches r1R, 42R, 41L and 42L, and a circuit 50 for judging a folded mirror body connected in series with an erecting relay Ry1.

The erecting relay circuit 31 and the folding relay circuit 32 are connected in parallel with each other. A transfer-type relay contact S1 of the erecting relay Ry1 is connected in parallel with a transfer-type relay contact S2, thereby forming self-holding circuits of both relays. The limit switches 41R and 42R detect the erected and folded positions of the right mirror body 17, and the limit switches 41L and 42L detect the erected and folded positions of the left mirror body. These limit switches are provided, for example, on the top surface of the extension 14, but they are omitted from FIG. 1. Each pair of these limit switches is connected in series with each other in the motor circuit 35 and 36 respectively with each reversible motor MR and ML between. The motor circuits 35 nd 36 includes overcurrent protection posistors PR, PL comprising positive characteristic thermistors. The circuit 50 for juding a folded state includes resistors r2 and r3, a PNP-type transistor Tr1, and delaying elements (comprising a resistor r4 and capacitor c1). When the electric current flows from the terminal N to the terminal B, the reversible motors MR and ML turn the mirror bodies towards the folded position, and when it flows from the terminal B to the terminal N, they turn the mirror bodies towards the erected position.

Now, the operation of the embodiment shown in FIG. 1 will be described.

First, the case where both of the left and right mirror bodies are in the folded positions will be described. When the switch 10 is pushed while the left and right mirror bodies are in the folded positions, the folding relay Ry2 is actuated first, and then the transfer contact S2 changes over to self-hold the relay Ry2. Since the limit switches 42R and 42L of the folding side are in positions "OFF", and since the limit switches 41R and 41L of the erecting side are in positions "ON", minus potential is applied to a base of the transistor Tr1 through the resistors r1 and r2. The transistor Tr1 is put on "ON", but by using the delaying elements r4 and c1, the relay Ry1 is excited after a predetermined period of time t1. By means of the excited relay Ry1 the transfer relay contact S1 changes over to NO side, and simultaneously with this change-over the relay Ry1 is self-held through diodes D5 and D6, while the relay Ry2 is demagnetized by the change-over of the transfer relay contact S1, and the relay contact S2 changes over to NC side to open the self-holding. Then the motor circus 35 and 36 passing along the NO contact of the relay contact S1, the positions PR and PL, the limit switches 41R and 41L, the diodes D3 and D4 as well as the NC side of the relay contact S2, are closed, and the electric current flows from the terminal B to the terminal N, rotating the motors MR and Ml so that the mirror bodies are turned to the erecting side. At the beginning of the erecting operation the limit switches 42R and 42L re put to "ON". When the limit switches 41L and 41R are put to "OFF" after the mirror bodies have reached the erecting ends, the motor circuits 35 and 36 are opened to stop the motors. The timing chart of the above-described operation is shown in I of FIG. 3.

When the switch 10 is pushed while both of the left and right mirrors are in the erected positions, the folding relay Ry2 is excited through the NC circuit of the transfer contact S1. By means of the excited relay Ry1 the transfer relay contact S2 changes over to NO side, and the relay Ry2 is self-held through the limit switches 42R and 42L, and the diodes D7, D8 and D9, while the motor circuits 35 nd 36 are closed through the motors MR and ML, the diodes D1 and D2, and the NC circuit of the transfer contact S1, and then the electric current flows from the terminal N to the terminal B, reversing the motors MR and ML so that the mirror bodies are turned towards the folded positions. At the beginning of the turning of the mirror bodies the limit switches 41R and 41L are put to "ON". In FIG. 2, since the potential impressed to a base of the transistor Tr1 is lower in respect of the forward voltage VF (approximately 0.6V) of diodes D7 and/or D8 than a supply voltage, the potential impressed to the emitter of the transistor Tr is controlled by the forward voltage of the diode D11. The diode D10 is provided therein to prevent the self-holding electric current to the relay Ry2 from flowing to the emitter of the transmitter Tr1. Further diodes D12, D13 are diodes for absorbing the counter electromotive force when relays Ry1, Ry2 are in position "OFF".

When the mirror bodies have reached the folded positions, the limit switches 42R and 42L are put to "OFF", thus turning off and stopping the motors MR and ML. At the same time minus potential is impressed to the cathode sides for the diodes D7 and D8, so that the relay Ry2 is demagnetized (see II of FIG. 3). In this process, if either of the mirror bodies, for example, the left mirror body has reached the folded position before the right mirror body, the limit switch 42L is put to "OFF", thereby stopping only the left motor ML. But since the relay Ry2 is self-held through the limit switch 42, the diode D7, the diode D9, the relay Ry1 and the NC circuit of the transfer contact S1, switch 42 and the diode D7, the reversible motor MR and remains "ON" till the right mirror body reaches the folded position. If the right mirror body has reached the folded position before the left mirror body, the left motor ML remains "ON" till the left mirror body reached the folded position. If overcurrent flows in the motor circuits 35 and 36, the motors are stopped by means of the actuated positions PL and PR.

As described above, while either of the limit switches 42R and 42L is in position "ON", the transistor Tr1 is not put to "ON" because of the potential of "H" level impressed to the base thereof through the resistor r2. Only when both of the limit switches 42R and 42L are in position "ON", the potential of "L" level is impressed to the base of the transistor Tr1 through the resistors r1 and r2, thereby putting by the transistor to "ON". The transistor Tr1 comes into actuation when the switch 10 is put to "ON", and it judges the folded state while passing along the output delaying circuit. That is, when either of the left and right mirror bodies continues to be folded, the transistor Tr1 goes out of actuation, and when the mirror body is already in the folded position, the transistor continues to be actuated, thus exciting the relay Ry1 through the delaying circuit of the output side thereof.

When the switch 10 is pushed while, as described above, one of the left and right door mirrors is in the folded position, and the other is in the non-folded position, the potential of the base of the transistor Tr1 is pulled down to "L " level by the resistor r1, thus putting the transistor Tr1 to "ON" and trying to excite the relay Ry1 after the delaying time t1 determined by the resistor r4 and the capacitor c1. But, since either of the limit switches 42R and 42L is in position "ON", the potential of the base of the transistor Tr1 is soon raised to "H" level, thus putting the transistor Tr1 to "OFF". Assuming that the period of time from "ON " to "OFF" of the transistor Tr1 is expressed as t2, a relation t2>t1 is predetermined, so that the relay Ry1 is not excited, and only the relay Ry2 remains "ON" thereby folding the non-folded mirror body.

Figure 4:
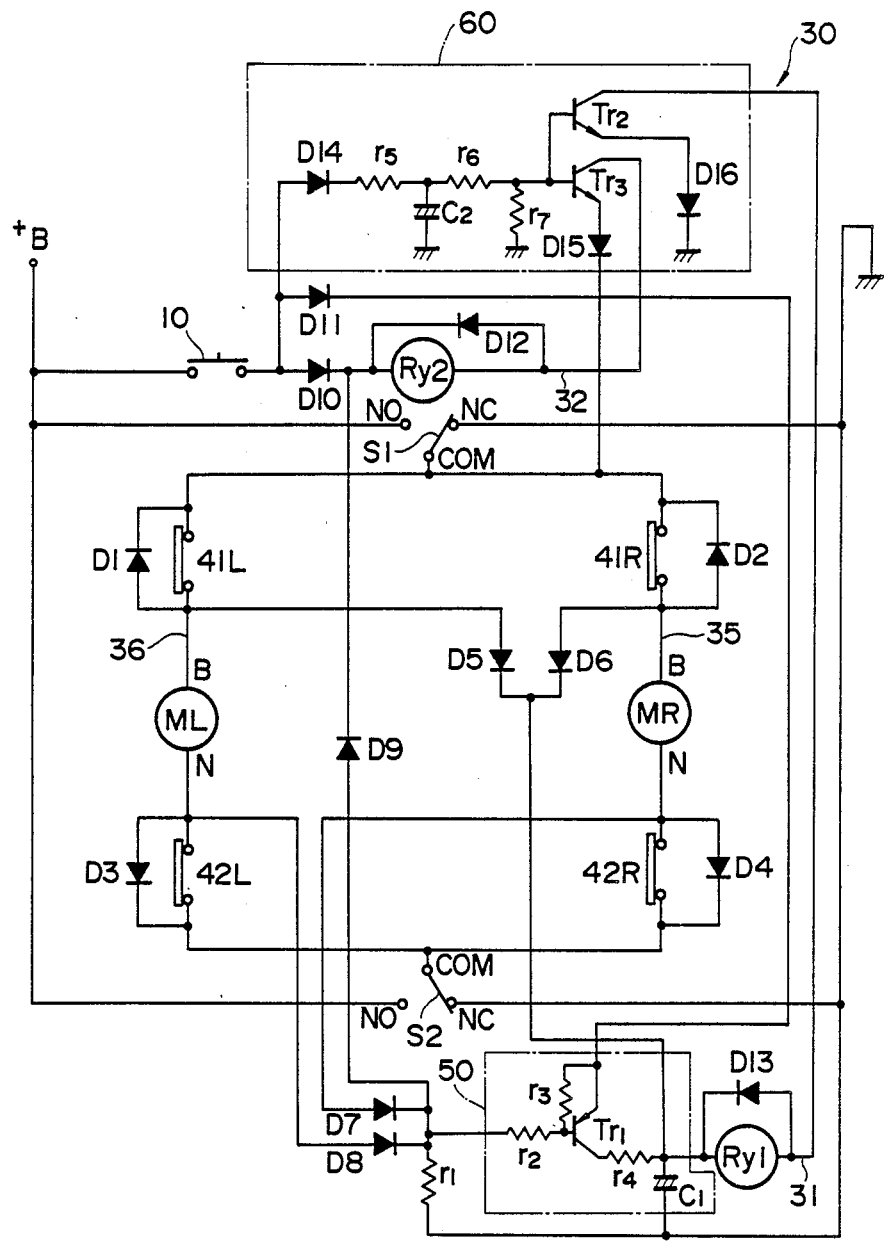
FIG. 4 is a circuit diagram showing another embodiment of the system according to the present invention.

Now, another embodiment of the present invention will be described with reference to FIG. 4.

Figure 3:
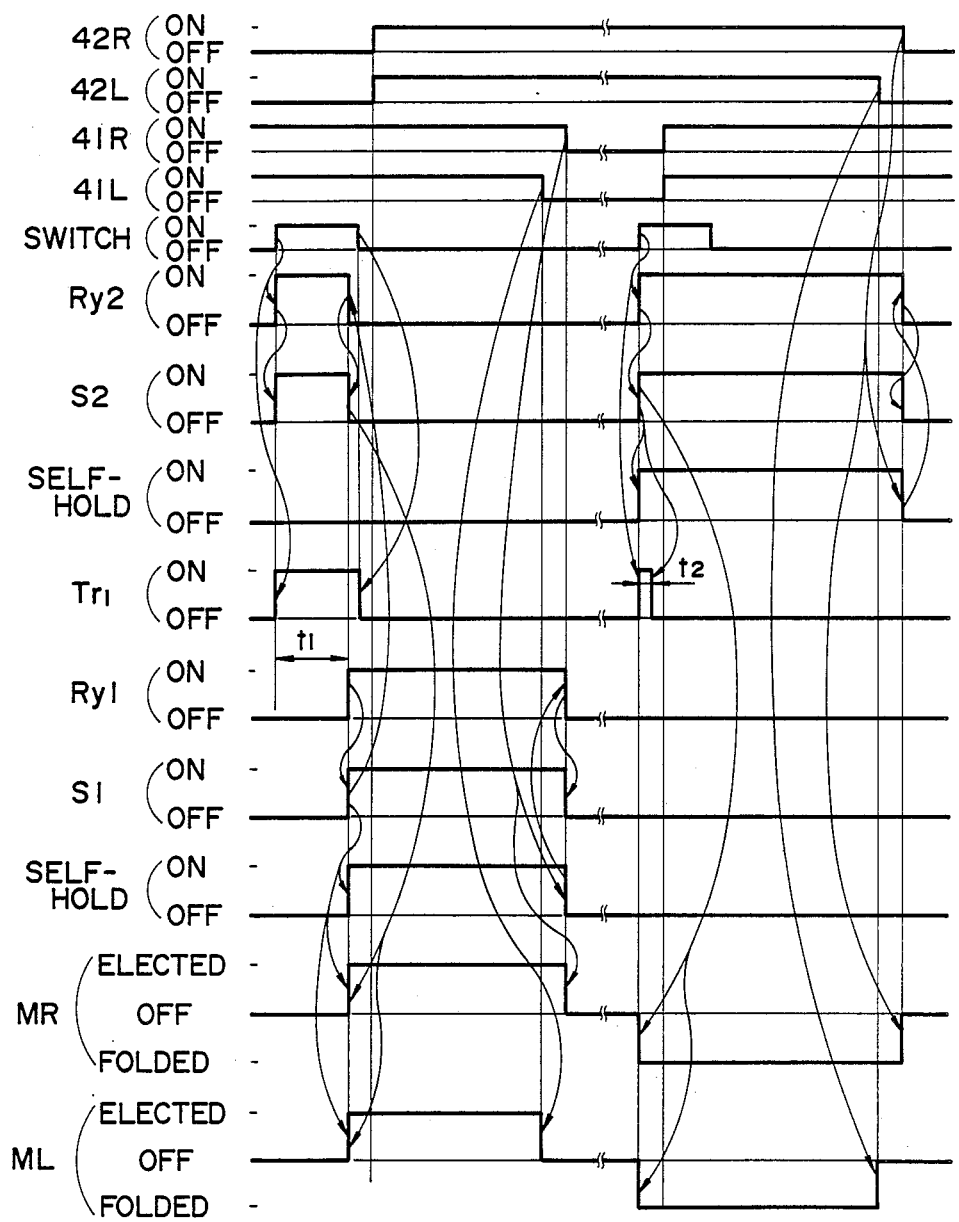
FIG. 3 is a timing chart of the circuit of FIG. 2.

In this embodiment, a timer circuit is additionally connected in series with each of the folding relay and the erecting relay. This timer circuit 60 comprises a charge and discharge circuit including a diode D14, resistors r5, r6 and r7, and a capacitor c2, as well as transistors Tr2 and Tr3, and diodes D15 and D16. The transistors Tr2 and Tr3 are connected in parallel with each other. A collector of the transistor Tr2 is connected in series with the erecting relay Ry1, and a collector of the transistor Tr3 is connected in series with the folding relay Ry2. The overall circuit is the same as in FIg. 2 except for that no resistors are used. When the switch 10 according to FIG. 3 is pushed, the capacitor c2 is charged through the diode 14 and the resistor r5.

The electric charge accumulated in the capacitor c2 is discharged through the resistors r6 and r7, keeping the transistors Tr2 and Tr3 "ON" for a predetermined period of time and thus exciting the folding relay Ry2. When the left and right mirror bodies are in the erected positions, the relay contact S2 changes over to NO side, so that the relay Ry2 is self-held, while the erecting relay Ry1 remains non-excited since the transistor Tr1 of the circuit 50 for judging the folded state is not put to "NO".

When the switch 10 is pushed while the left and right mirror bodies are in the folded positions, the relay Ry2 is not self-held because of the "OFF" positions of the limit switches 42R and 42L. As a result thereof the timer circuit 60 is actuated to close the circuit including the transistor Tr3, diode D15, limit switches 41R and 41L, diodes D5 and D6, relay Ry1, transistor Tr2, and diode D16 after a predetermined period of time, and then the electric current flows from the terminal B to the terminal N, rotating the motors MR ad ML so that eh mirror bodies are turned to the erected side. As in the first embodiment, the relay contact S1 changes over to NO side and is self-held by means of the excited relay Ry1.

As described above, the limit switches 41R, 41L, 42R and 42L detect the folded or erected position of the mirror bodies, and then the folding relay is preferentially actuated. When the circuit 50 for judging the folded state detects the erected mirror bodies thereafter, the folding relay is kept excited, and when the circuit 50 detects the folded mirror bodies, the folding relay is put to "OFF", and the reacting relay is excited. If any of the mirror bodies is not erected or folded by coming into contact with any other structures, the limit switch 41R, 41L, 42R or 42L is not put to "OFF" within a predetermined period of time, so that the said transistor Tr2 or Tr3 is put to "OFF", and the relay Ry1 or Ry2 is immediately unexcited. Therefore, the motors MR and ML can be protected from overcurrent without using resistors.

I claim:
1. An electrically driving system for foldable rearview mirrors of motor vehicle comprising:
 a plurality of rearview mirror bodies foldably mounted on the outer side of a motor vehicle;
 reversible electric motors each mounted in each of said mirror bodies;
 a single-pole single-throw momentary operational switch provided in a vehicle compartment;
 a relay circuit including a single erecting relay and a single folding relay, wherein said relays are capable of being excited in response to the operation of said switch;

a self-holding relay for reciting said folding relay in response to the operation of said switch;
a motor circuit;
limit switches for cutting off said relay circuit and motor circuit respectively by detecting erected and folded positions of the said mirror bodies; and
a means for judging a folded state, wherein said means keeps said folding relay excited when at least one of said mirror bodies is not in the folded position, and it renders said erecting relay excited when both of said mirror bodies are in the folded positions.

2. The system as claimed in claim 1, wherein said self-holding relay comprises a first self-holding circuit of said erecting relay and a second self-holding circuit of said folding relay, and each of said first and second self-holding circuits includes a transfer contact which changes over from "normal close" to "normal open" when the relay of the circuit concerned is excited.

3. The system as claimed in claim 1, wherein said operational switch is a push button which is automatically reset by one-push.

4. The system as claimed in claim 1, wherein said motor circuit includes overcurrent protection resistors which are connected in series with said motors.

5. The system as claimed in claim 1, wherein said means for judging a folded state comprises a PNP-type transistor and delaying elements provided on the output side of said transistors, and said circuits connected inserts with said erecting relay.

6. An electrically driving system for foldable rearview mirrors of motor vehicle comprising:
a plurality of rearview mirror bodies foldably mounted on the outer side of a motor vehicle;
reversible electric motors each mounted in each of said mirror bodies;
a momentary operational switch provided in a vehicle compartment;
a relay circuit including a erecting relay and a folding relay, wherein said relays are capable of being excited in response to the operation of said switch;
a self-holding relay for exciting said folding relay in response to the operation of said switch;
a motor circuit;
limit switches for cutting off said relay circuit and motor circuit respectively by detecting erected and folded positions of the said mirror bodies;
a means for judging a folded state, said judging means keeping said folding relay excited when at least one of said mirror bodies is not in the folded position, and it renders said erecting relay excited when both of said mirror bodies are in the folded positions; and wherein each relay circuit of said folding relay and erecting relay includes a timer circuit which is connected in series therewith.

* * * * *